United States Patent [19]
Meyer et al.

[11] Patent Number: 5,501,404
[45] Date of Patent: Mar. 26, 1996

[54] MANURE SPREADER WITH VERTICAL EXPELLERS

[75] Inventors: Donald A. Meyer; Larry Meyer, both of Dorchester, Wis.

[73] Assignee: Meyer Manufacturing Corporation, Dorchester, Wis.

[21] Appl. No.: 272,051

[22] Filed: Jul. 8, 1994

Related U.S. Application Data

[63] Continuation-in-part of Ser. No. 888,191, May 26, 1992, Pat. No. 5,368,236.

[51] Int. Cl.⁶ ................................................. A01C 23/00
[52] U.S. Cl. ........................ 239/676; 239/679; 239/682; 111/11
[58] Field of Search ................................ 239/679, 681, 239/682, 676; 111/11, 118

[56]  References Cited

U.S. PATENT DOCUMENTS

| | | | |
|---|---|---|---|
| 2,619,355 | 11/1952 | Trees | 239/675 X |
| 2,891,655 | 6/1959 | Saiberlich | 239/675 |
| 2,959,421 | 11/1960 | Van Der Lely et al. | 239/679 |
| 3,206,215 | 9/1965 | De Jong | 239/684 |
| 3,539,113 | 11/1970 | Tyler | 239/673 |
| 3,656,638 | 4/1972 | Hutton et al. | 239/681 X |
| 4,124,166 | 11/1978 | Lucas | 239/675 X |
| 4,350,303 | 9/1982 | Van Der Lely | 239/682 X |
| 4,473,184 | 9/1984 | Martin | 239/675 X |
| 4,597,532 | 7/1986 | Linde et al. | 239/675 |
| 4,801,085 | 1/1989 | Fischer | 239/675 X |
| 4,850,515 | 7/1989 | Cleland | 222/161 |
| 5,082,186 | 1/1992 | Bruns | 239/682 |
| 5,085,372 | 2/1992 | Martin | 239/675 |

FOREIGN PATENT DOCUMENTS

| | | | |
|---|---|---|---|
| 512003 | 1/1951 | Belgium | 239/679 |
| 1219937 | 5/1960 | France | 239/679 |
| 1254748 | 1/1961 | France | 239/679 |
| 2342631 | 9/1977 | France | 239/682 |
| 925682 | 3/1955 | Germany | 239/679 |
| 1181965 | 11/1964 | Germany | 239/682 |
| 1253462 | 8/1986 | U.S.S.R. | 239/682 |
| 788850 | 1/1958 | United Kingdom | 239/682 |
| 1030905 | 5/1966 | United Kingdom | 239/682 |

Primary Examiner—Dave W. Arola
Assistant Examiner—Christopher J. Novosad
Attorney, Agent, or Firm—Donald Cayen

[57] ABSTRACT

An improved manure spreader has two augers that lie in respective channels in the floor of the manure spreader box. The augers are journaled only at the front end of the box. Center and side holddowns overlie portions of the auger peripheries to restrain the augers from rising out of the channels. The augers propel material to a discharge opening in the box back wall. One or two rapidly rotating expellers on the outside of the box discharge opening receive the material and fling it onto the ground. The expellers may rotate about vertical or horizontal axes. A gate is slidable within the box back wall to selectively open and close the discharge opening. A breakup bar is pivotally connected between the gate and a cross brace in the box. Raising and lowering the gate simultaneously opens and closes the discharge opening and pivots the breakup bar. The breakup bar penetrates material in the box to thereby prevent bridging of the material over the augers. In a modified embodiment, a single auger is used, together with two side holddowns.

3 Claims, 4 Drawing Sheets

_FIG 6_

_FIG 7_

_FIG 8_

MANURE SPREADER WITH VERTICAL EXPELLERS

This is a continuation-in-part of application Ser. No. 07/888,191 filed on May 26, 1992, now U.S. Pat. No. 5,368,236.

BACKGROUND OF THE INVENTION

1. Field of the Invention

This invention pertains to agricultural implements, and more particularly to apparatus for applying fertilizers to fields.

2. Description of the Prior Art

Various equipment has been developed to spread fertilizer onto lawns, gardens, and fields. An especially important fertilizer-related machine is the manure spreader. Such machines are practically indispensable for transporting animal wastes from confined areas such as barns and barnyards and for recycling the wastes as fertilizer onto fields.

Manure spreaders invariably include a storage tank or box that is mounted on wheels for being pulled over the ground by a tractor. Manure spreaders also usually include an auger, conveyor, or similar device that propels the material to a discharge opening in the box. One or more rotary expellers are normally located at the discharge opening. The discharge opening and expellers are usually located on a side of the box near the front end of the machine. Material fed by the auger or conveyor to the discharge opening is accelerated by the expellers and flung a distance from the manure spreader, thereby spreading the material more or less evenly onto the surrounding field.

Examples of prior manure spreaders may be seen in U.S. Pat. Nos. 4,124,166; 4,473,184; and 5,085,372. The manure spreaders of the three foregoing patents, like the majority of commercial equipment presently available, include expellers that rotate about horizontal axes. Such machines, although in widespread use, are not completely satisfactory. They are able to handle liquid and semi-solid manure without problems, but they have difficulty in spreading solid or compacted material. A disadvantage of front discharge machines is that they must be operated with care to make certain the wind does not blow discharged material against the tractor.

U.S. Pat. No. 3,539,113 shows a manure spreader that has two flat disks that rotate about respective vertical axes. Material is fed by a conveyor to a discharge opening, whereat the material falls by gravity onto the rotating disks. The disks fling the material outwardly to spread it on the field. The disks are located relatively close to the ground, and therefore the spreading area is limited. In addition, the disks do not handle solid materials very well.

U.S. Pat. No. 4,350,303 describes a manure spreader that has two disks that rotate about respective vertical axes and also tined carriers concentric with and located above the disks. Long resilient tines reach through the storage box discharge opening and over the box floor. The tines occupy practically the entire area of a single large discharge opening. The tines scrape material in the box and fling it outwardly through the discharge opening. Material that passes past the tines falls to the disks for being flung onto the fields. The device of the U.S. Pat. No. 4,350,303 patent requires the tine driving mechanism to produce considerable torque in order for the tines and carrier to accelerate material out of the box. In addition, the tines are susceptible to malfunction due to improper and even permanent bending thereof during operation.

Many prior manure spreaders employ one or two augers for moving material to the discharge opening. U.S. Pat. No. 4,124,166 is a typical example of a dual auger machine. It is a difficult problem to design proper supports and restraints for augers in machines with discharge openings at the back end of their boxes. That is because it is desirable for the auger to terminate at the discharge opening, but placing a bearing there blocks flow of material through the discharge opening. Some prior machines are designed with augers that float within the box, but that solution is not considered satisfactory.

Another problem commonly encountered in manure spreaders is the tendency of solid material to bridge over the augers or conveyor. U.S. Pat. No. 5,085,372 shows a manure spreader with a side discharge opening. An auger has one end journaled in a vertically reciprocable plate located near the discharge opening. By raising and lowering the plate, the auger is tilted about its other end to break up the material. That design is not practical for manure spreaders having discharge openings at the back end of their boxes.

U.S. Pat. No. 4,597,532 shows a manure spreader with a material breakup device in the form of an oscillating arm. One end of the arm is pivotally connected to a side wall of the storage box. A hydraulic cylinder is used to oscillate the arm about an axis parallel to the direction of general movement of the material through the box. The oscillating arm penetrates the material to break it up and prevent bridging.

U.S. Pat. No. 4,850,515 discloses a small hopper for dispensing particulate materials in beverage machines. A helical auger is used to transfer material within a receptacle. A bar is cantilever mounted at one end to the receptacle. The other end of the bar has a finger that engages the auger. Rotation of the auger causes the finger to rise and fall and thus cause the bar to pivot in a plane generally parallel to the axis of the auger. Such an arrangement is satisfactory for small particulate dispensing machines, but it is entirely unsuitable for use with agricultural fertilizer spreaders.

Thus, despite the numerous kinds of machines available for discharging and spreading fertilizers, further improvements to such machines are needed.

SUMMARY OF THE INVENTION

In accordance with the present invention, an improved manure spreader is provided that includes several novel features that render it more efficient and productive than prior equipment. This is accomplished by apparatus that includes holddowns for one or more augers that discharge material through a back end discharge opening to one or more high speed expellers.

The improved manure spreader comprises a sturdy frame that supports a storage box or tank. The auger lies on the box floor, preferably within a generally semi-circular channel formed in the box floor. The auger extends from the front end of the box to the discharge opening in the box back wall. The auger is rotated by means of a generally conventional drive mechanism located at the front end of the manure spreader.

According to one aspect of the present invention, only the drive or front end of the auger is journaled to the box. To prevent the back end of the auger from rising from the box floor, the improved manure spreader comprises a side holddown attached to each of the side walls of the box. Each side holddown overlies a portion of the periphery of the auger above its longitudinal axis. The side holddowns thus cooperate to retain the auger vertically in place on the box floor.

In the preferred embodiment, the discharge opening has a lower section and an upper section. The lower section is defined by a concave surface that is a continuation of the semi-circular channel of the box floor. The discharge opening upper section may be generally rectangular in shape. Except for a short distance at the bottom of the concave section, the discharge opening is surrounded by a short duct that is fixed to and extends rearwardly from the outside of the box back wall.

The discharge opening is selectively closeable by a vertically reciprocable gate that is slidably mounted in the box back wall. The gate has a lobe that is nestable within the auger channel. The gate is raised and lowered by a hydraulic cylinder mounted to the box. When the gate is lowered, its lobe nests in the box floor channel to close the discharge opening.

In an alternate embodiment of the present invention, two augers are utilized. The augers lie side-by-side in respective semi-circular channels in the box floor. A center holddown is located between the two augers. The center holddown overlies first portions of the peripheries of the augers above their respective longitudinal axes. There is also a side holddown attached to each of the side walls of the box. Each side holddown overlies a second portion of the periphery of an associated auger above its longitudinal axis. The center and side holddowns cooperate to laterally retain the augers in place on the box floor. When two augers are used, the discharge opening has two concave surfaces that are continuations of the semi-circular channels in the box floor. Similarly, the gate has two lobes that are nestable within the associated auger channels.

The improved manure spreader of the present invention may utilize one or two expellers, and the expellers may rotate about either vertical or horizontal axes. In all variations, the expellers are located in line with and a short distance in back of the box discharge opening. The axis of a horizontal expeller is parallel to the box back wall. With a horizontal expeller, the length of the expeller is approximately equal to the width of the box discharge opening. With a vertical expeller, the length of the expeller is equal to at least one-half of the height of the discharge opening.

Each expeller is designed with a central core and several toothed blades that extend radially from the central core. The toothed blades are configured to shred and tear the material fed by the auger through the discharge opening. The toothed blades are preferably divided axially along the expeller axis into two sections. The blades of one section are angularly displaced about the expeller axis relative to the blades of the other section. Especially with vertically oriented expellers, their relatively high location above the ground enables them to throw the material at great distances from the manure spreader.

Further in accordance with the present invention, a material breakup bar is pivotally mounted in the box to prevent bridging of material over the augers. One end of the break up bar is pivotally connected to a cross brace that extends between the opposite side walls of the machine box. The bar extends longitudinally over the center of the box floor toward the machine back wall. The second end of the bar is pivotally connected to the gate. Consequently, actuation of the hydraulic cylinder to raise and lower the gate simultaneously causes the bar to pivot about its first end. Such pivoting action causes the bar to penetrate material in the box and break up any material bridged over the augers.

Other advantages, benefits, and features of the present invention will become apparent to those skilled in the art upon reading the detailed description of the invention.

DETAILED DESCRIPTION OF THE PREFERRED EMBODIMENT

Although the disclosure hereof is detailed and exact to enable those skilled in the art to practice the invention, the physical embodiments herein disclosed merely exemplify the invention, which may be embodied in other specific structure. The scope of the invention is defined in the claims appended hereto.

Referring to FIGS. 1–5, an improved manure spreader 1 is illustrated that includes the present invention. The manure spreader 1 is particularly useful for spreading compacted and solid manure onto agricultural fields, but it will be understood that the invention is not limited to animal waste applications.

Figure 1:
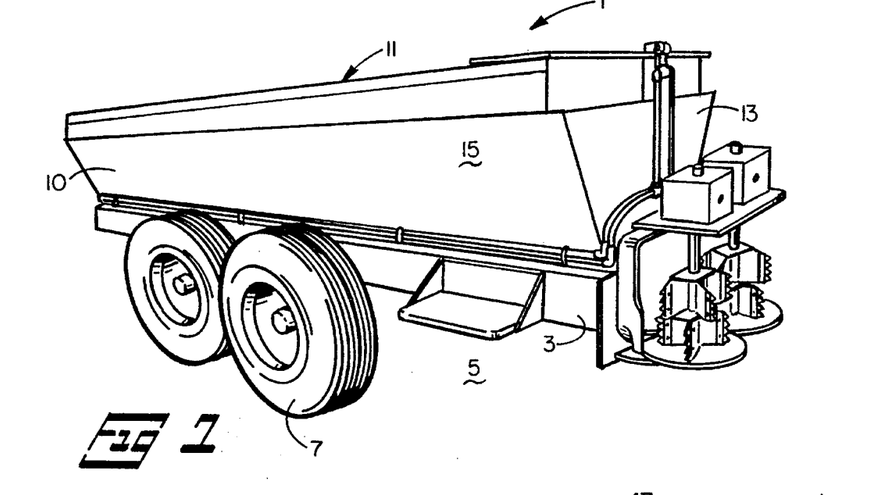
FIG. 1 is a perspective view of the improved manure spreader of the present invention.
Figure 2:
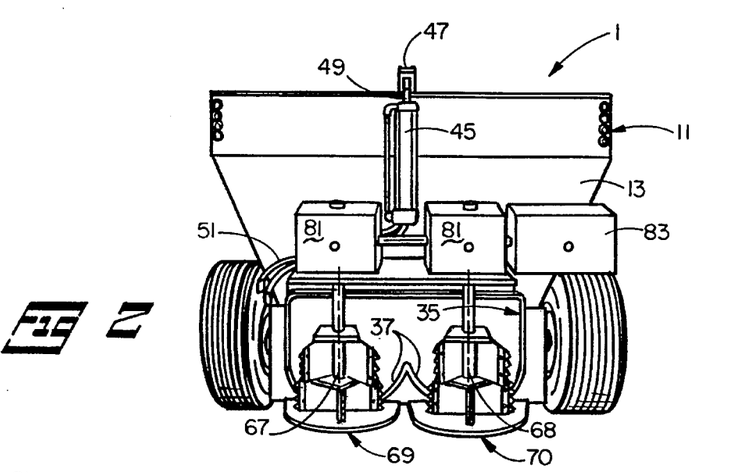
FIG. 2 is a back view of the improved manure spreader.

The improved manure spreader 1 is comprised of a sturdy frame 3 that is supported for rolling along the ground 5 by known axles and wheels 7. The manure spreader is normally pulled over the ground by a tractor, not shown, that connects to a tongue at the front end 10 of the frame 3. The frame 3 supports a tank or box 11. The box 11 has a back wall 13, side walls 15 and 17, and a floor 19. In the illustrated construction, the box floor 19 is manufactured with a pair of generally semi-circular channels 21. A central web portion 22 of the floor 19 separates the two channels 21.

A pair of augers 23 having respective longitudinal axes 24 are placed in the floor channels 21. The augers 23 are rotatably driven from a conventional drive mechanism located at the front end 10 of the manure spreader 1. In turn, the auger drive mechanism is driven by a power take-off shaft from the tractor, as is known in the art.

In keeping with one aspect of the present invention, the augers 23 are journaled only at the front end 10 of the manure spreader 1. The auger drive mechanism includes suitable bearings that prevent the augers from moving axially within their respective channels 21. To prevent the augers 23 from rising up out of the channels 21, the present invention includes a center auger holddown 27 and a pair of side auger holddowns 29. The center holddown 27 may be fabricated as a round bar of steel or similar material that is bolted to the peak 31 of the channel web 22. The center holddown bar 27 overlies a portion of the peripheries of both augers adjacent the web. Each side holddown 29 may be fabricated as a long flat piece of sheet metal bent lengthwise to form a rather long tab 33. The side holddowns are mounted to the manure spreader box side walls 15 and 17 such that the tabs 33 overlie the portions of the auger peripheries adjacent the box side walls. The center and side holddowns cooperate to prevent the augers from rising up out of their respective channels. On the other hand, the augers are free to be slid lengthwise into their channels 21 at assembly.

Figure 3:
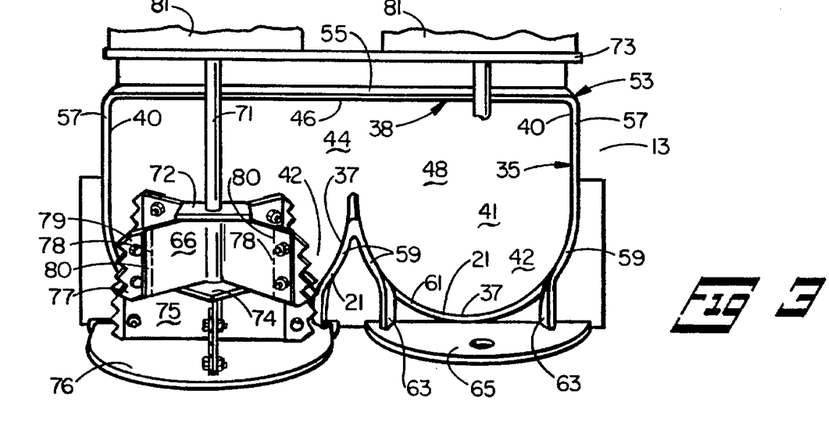
FIG. 3 is a back view on an enlarged scale of the discharge opening and an expeller of the present invention.
Figure 5:
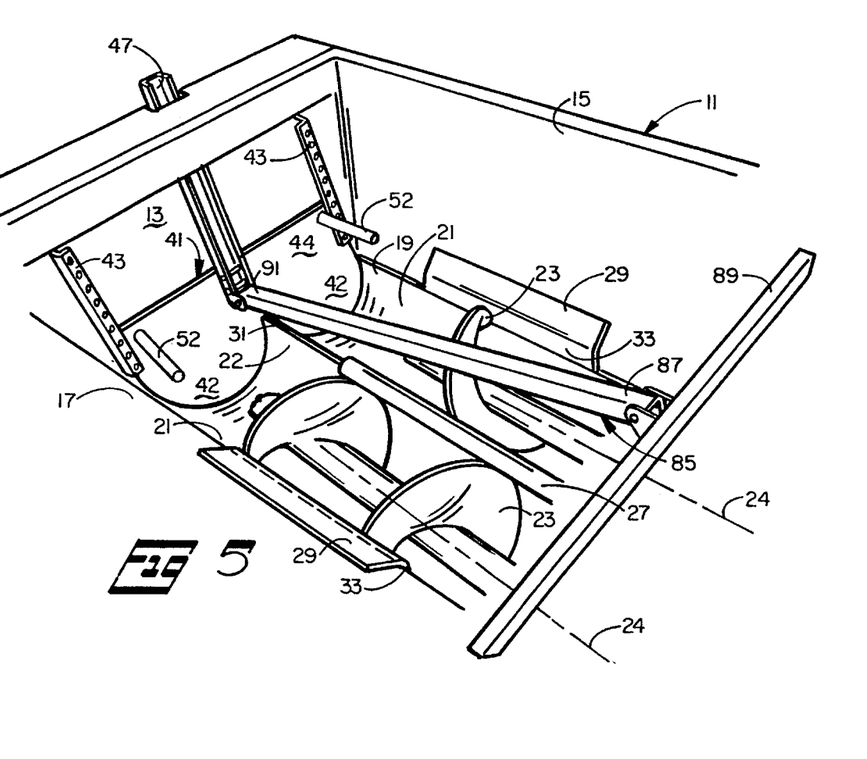
FIG. 5 is a perspective view of the back wall and breakup bar of the improved manure spreader.

The back wall 13 of the manure spreader box 11 is formed with a discharge opening 35. The contour of the discharge opening 35 includes a pair of generally semi-circular concave surfaces 37. The concave surfaces 37 are aligned with respective channels 21 of the box floor 19. The discharge opening concave surfaces 37 continue into an upper surface 38, which may be in the shape of straight side surfaces 40 and a top surface 46. The surfaces 40 and 46 define an upper section 48 of the discharge opening above the concave lower surfaces 37.

To selectively open and close the discharge opening 35, the improved manure spreader 1 further comprises a gate 41. In the preferred embodiment, the gate 41 is fabricated with a pair of lobes 42 having respective contours that match the channels 21 of the box floor 19. The gate further has a rectangular section 44 above the lobes 42. The gate rectangular section 44 has generally the same shape but is slightly larger in area than the upper section 48 of the discharge opening 35. The gate 41 is mounted for vertical reciprocation in tracks 43 attached to the inside of the box back wall 13. Reciprocation of the gate is achieved by a hydraulic cylinder 45 mounted to the outside of the box back wall. The lower end of a long channel 47 is fixed to the gate and extends to the top of the box back wall. The piston rod 49 of the cylinder 45 is connected to the upper end of the channel 47. Hydraulic lines 51 from the tractor supply hydraulic fluid to the cylinder. By actuating suitable controls in the tractor, the cylinder can be made to raise and lower the gate. When the gate is in its raised position, the discharge opening 35 is opened. When the gate is in its lowered position, the gate lobes 42 nest within the channels 21 in the box floor 19, and the gate rectangular section 44 covers the upper section 48 of the discharge opening. Two or more rods 52 may be welded to the inside of the gate, preferably adjacent the tracks 43.

Figure 4:
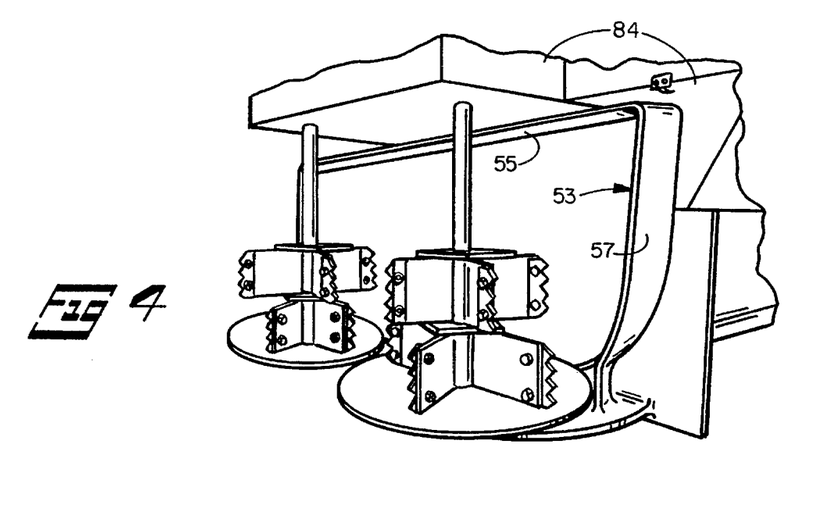
FIG. 4 is a perspective view of the expellers and the discharge opening.

The discharge opening 35 is surrounded by a short duct 53 that extends rearwardly from the outside of the box back wall 13. The duct 53 has a horizontal top wall 55 and opposed vertical side walls 57 that match the top surface 46 and side surfaces 40, respectively, of the discharge opening. The duct side walls 57 blend into associated arcuate walls 59 that match the concave surfaces 37 of the discharge opening. There is a gap 61 in each arcuate wall 59 near its lowermost point. The gap 61 in each of the arcuate walls 59 lies between a pair of short generally triangular-shaped plates 63. The plates 63 extend at an angle backwardly from each arcuate wall and are welded to a lower horizontal platform 65. The platform 65 is welded to and extends rearwardly from the box back wall 13.

Mounted for rotation about respective vertical axes 67 and 68 outside of the box back wall 13 are a pair of expellers 69 and 70. The expeller axes 67 and 68 are preferably spaced apart a distance greater than the distance between the longitudinal axes 24 of the two augers 23. Each expeller 69, 70 is manufactured with a central core 71 that is journaled at one end in the lower horizontal plate 65. The other end of the central core 71 of each expeller is journaled in an upper horizontal platform 73. The upper horizontal platform 73 is welded to and extends rearwardly from the box back wall above the duct top wall 55.

In the illustrated construction, each expeller 69, 70 also has a first end plate 72, a center plate 74, and a second end plate 76 that lie in respective planes perpendicular to the expeller longitudinal axis. Between the first end plate 72 and the center plate 74 are a number of blades 66 that extend radially from the central core 71. A number of similar blades 75 extend radially from the central core between the center plate and the second end plate 76. The blades 66 are angularly offset from the blades 75. An expeller having four blades 66 spaced 90 degrees apart and four blades 75 spaced 90 degrees apart with the four blades 66 being angularly offset 45 degrees from the blades 75 works very well. The blades 66, 75 need not be flat. Rather, their ends distal from the central core may be bent along lines 78 to form end panels 80. The panels 80 terminate in teeth 77. If desired, the teeth 77 may be formed on separate bars 79 that are removably attachable to the expeller blades. The length of the expellers is equal to at least one-half of the overall height of the discharge opening 35. The two expellers 69 and 70 are angularly oriented relative to each other about their respective axes of rotation 67 and 68 such that the blades 66 of one expeller are angularly midway between the blades 66 of the other expeller, and the blades 75 of one expeller are angularly midway between the blades 75 of the other expeller as the expellers rotate. In that manner, the blades are never tooth-on-tooth as the two expellers rotate.

To rotate the expellers 69 and 70, the improved manure spreader 1 is provided with a pair of gear boxes 81. The gear boxes 81 are mounted to the upper horizontal platform 73 and are connected with the associated expellers. The gear boxes are powered from the tractor power take-off shaft via suitable power transmission components 83. Normally, the gear boxes and transmission 83 are covered with protective guards 84, which are partially shown in FIG. 4.

Further in accordance with the present invention, solid material to be spread by the improved manure spreader 1 is prevented from bridging over the augers 23 by a breakup bar 85. The breakup bar 85 has a first end 87 that is pivotally connected to a cross brace 89 that extends between the two side walls 15 and 17 of the box 11. The breakup bar is preferably located so as to generally overlie the web 22 of the box floor 19. The second end 91 of the breakup bar is pivotally connected to the channel 47 near its connection point with the gate 41. Consequently, actuation of the hydraulic cylinder 45 to raise and lower the gate simultaneously pivots the breakup bar about the cross brace 89.

In operation, the gate 41 of the improved manure spreader 1 is lowered to close the discharge opening 35. The box 11 is loaded in known manner, and a tractor pulls the manure spreader to a field. At the desired location, the hydraulic cylinder 45 is actuated to raise the gate a desired amount. The augers 23 are engaged to propel the material in the box toward the discharge opening. Simultaneously, the transmission 83 and the gear boxes 81 are engaged to rotate the expellers 69 and 70 at high speeds. The expellers rotate in opposite direction, preferably with the expeller 69 rotating counterclockwise and the expeller 70 rotating clockwise as viewed from above. As the augers propel the material through the discharge opening, the material is guided by the duct 53 to the expellers. The teeth 77 on the expellers shred the material, and the material is flung great distances by the high speed expellers. The rate of material discharge can be regulated by the area of the discharge opening that is uncovered by the gate 41. Should the manure spreader be loaded with solid or compacted material that tends to bridge over the augers, the hydraulic cylinder 45 can be actuated to raise and lower the gate and simultaneously pivot the breakup bar 85. The breakup bar penetrates the material within the box to knock down any bridged material. The rods 52 also tend to break up any bridging when the gate is raised and lowered.

Figure 6:
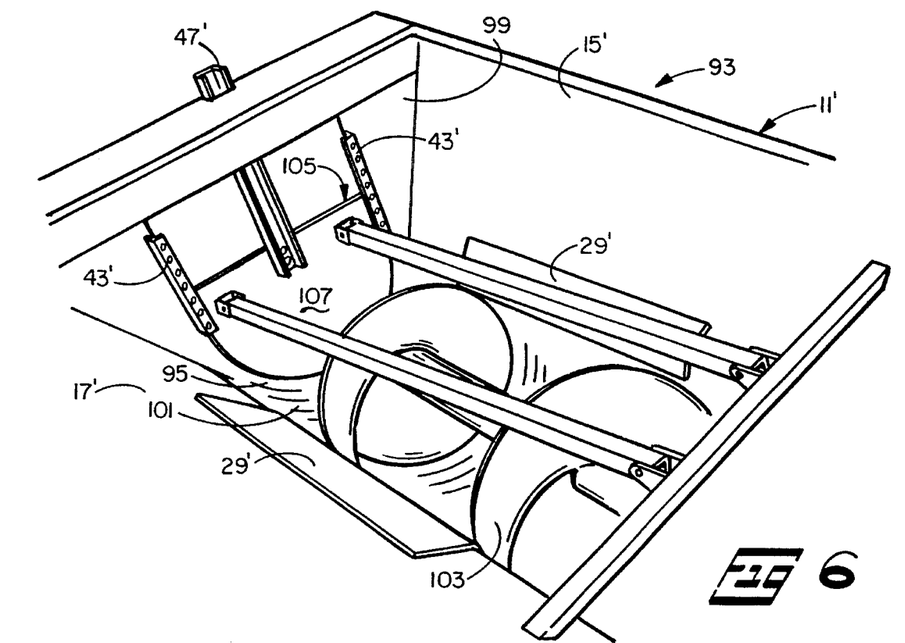
FIG. 6 is a view similar to FIG. 5, but showing a auger.
Figures 7, 8:
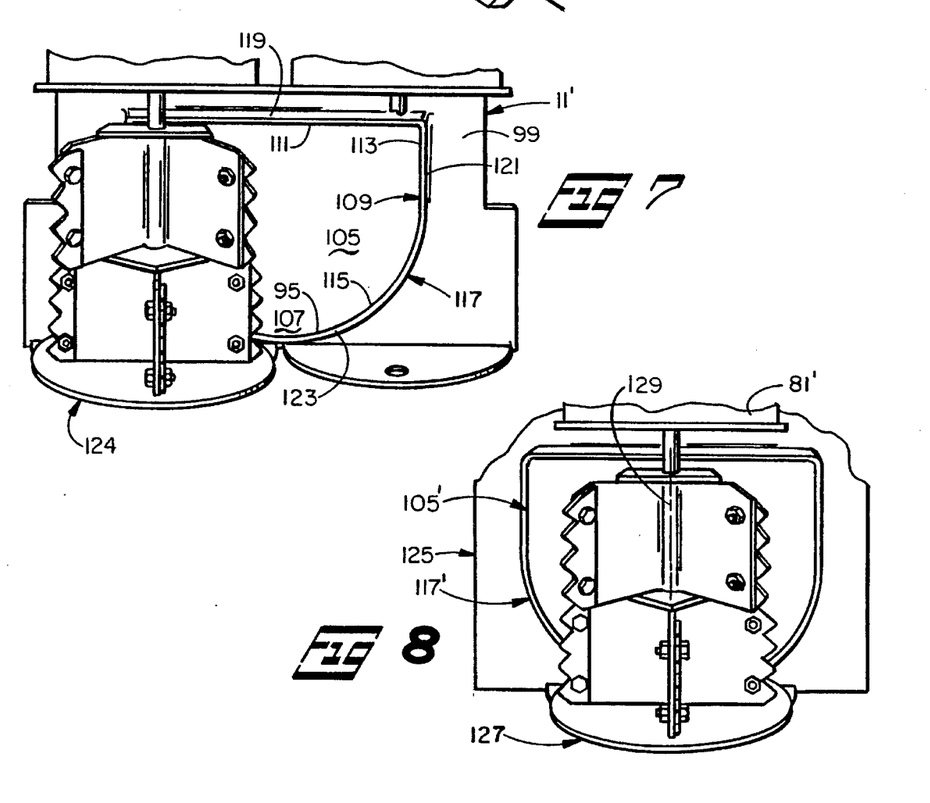
FIG. 7 is a view similar to FIG. 3, but showing a modified embodiment of the invention that utilizes only one discharge opening used with an improved manure spreader having one auger and an expeller having approximately the same height as the discharge opening.
FIG. 8 is a view similar to FIG. 7, but showing an improved manure spreader having a single expeller.

Now turning to FIGS. 6 and 7, a modified improved manure spreader 93 is illustrated. The improved manure spreader 93 has a box 11' comprising two side walls 15' and 17', a back wall 99, and a floor 101. In the embodiment of the improved manure spreader 93, only a single auger 103 is employed. The auger 103 has a relatively large diameter as compared with the augers 23 that are used in conjunction with the dual auger improved manure spreader 1 described previously. The auger 103 lies within a channel 95 formed in the box floor 101. The auger 103 is journaled only at its front end, not shown. A pair of side holddowns 29' are mounted to the box side walls 15' and 17'. The side holddowns 29' overlie associated portions of the periphery of the auger 103 to retain the auger against lifting up out of the channel 95.

The improved manure spreader 93 has a gate 105 in the back wall 99. The gate 105 is vertically reciprocable within tracks 43' attached to the inside of the box back wall 99. Reciprocation of the gate is achieved by a hydraulic cylinder, not illustrated in FIGS. 6 and 7, that is connected to a channel 47'. The gate 105 has a single large lobe 107 that is nestable within the channel 95 of the box floor 101. There is a discharge opening 109 in the back wall 99 of the box 11'. The discharge opening 109 has a contour that is defined by a straight horizontal top surface 111, a pair of short vertical side surfaces 113 that connect with the top surface, and a concave semi-circular surface 115 that blends into the side surfaces. The semi-circular surface 115 is aligned with the concave surface of the channel 95 of the box floor 101. A short duct 117 surrounds the discharge opening 109. The duct 117 has a top wall 119, two side walls 121, and a concave semi-circular bottom wall 123.

Raising and lowering the gate 105 by means of the hydraulic cylinder acting through the channel 47' opens and closes, respectively, the discharge opening 109. With the discharge opening open, the auger 103 propels material in the box 11' through the discharge opening and through the duct 117 to expellers 124. As an indication of the versatility of the present invention, the expellers 124 are illustrated as having lengths that are approximately equal to the height of the discharge opening 109. In all other respects, the expellers 124 are constructed and operated in a manner substantially similar to the expellers 69 and 70 described previously in conjunction with FIGS. 1–5.

Looking at FIG. 8, an improved manure spreader 125 utilizes a single auger (not shown), a gate 105', and a duct 117' that are substantially identical to the corresponding components described previously in conjunction with the improved manure spreader 93. However, in some instances it may be preferable to have only a single expeller 127. In that situation, the expeller 127 is mounted with its axis of rotation 129 vertical and approximately in line with the axis of the auger. The embodiment of FIG. 8 requires only one gear box 81' for the expeller 127; the transmission is located under a guard. The expeller 127 is shown as having a length that is approximately equal to the height of the discharge opening. However, it will be appreciated that the expeller 127 may have any shorter length that equals or exceeds one-half the height of the discharge opening.

Figure 9:
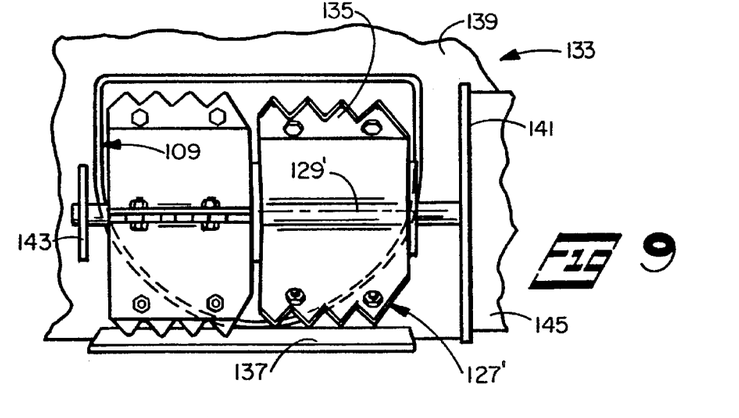
FIG. 9 is a view similar to FIG. 8, but showing an expeller that rotates about a horizontal axis.

In the improved manure spreader 133 of FIG. 9, a single expeller 127' is used, but the axis of rotation 129' thereof is horizontal. The lowermost line of the envelope defined by the rotating teeth 135 of the expeller 127' is approximately horizontally in line with the lowermost point of the discharge opening 109. A horizontal shelf 137 underlies the expeller 127' and is welded to the back wall 139 of the improved manure spreader 133. The gear box mounting plate 141, the expeller drive shaft bearing plate 143, and the gear box guard 145 are reoriented 90 degrees and relocated compared with the vertically oriented expellers described previously in order to provide the horizontal attitude of the expeller 127'. Operation of the improved manure spreader 133 is generally identical to that of the improved manure spreaders 1, 93, and 125 that have vertically oriented expellers. The rapidly rotating expeller 127' of the improved manure spreader 133 throws the material fed to it by the auger through the discharge opening 109 great distances in back of the manure spreader.

Figure 10:
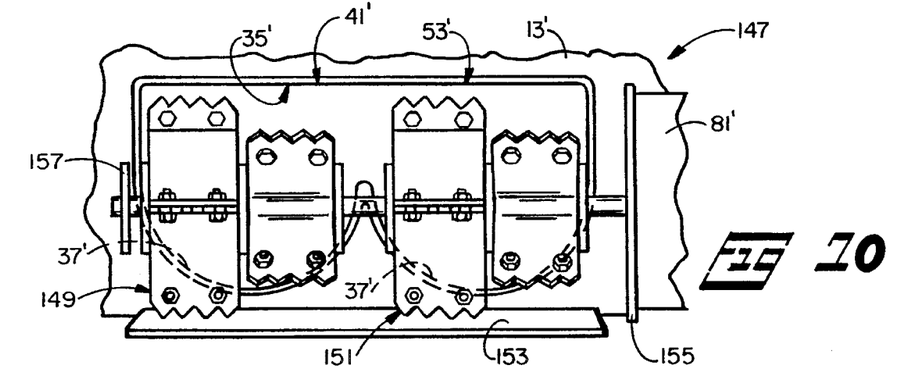
FIG. 10 is a back view of the discharge opening and two expellers mounted for rotation about a horizontal axis.

FIG. 10 illustrates an improved manure spreader 147 according to the present invention in which one or two horizontally arranged expellers 149, 151 are used in connection with two augers. The augers may be as described previously in conjunction with FIGS. 1–5. The improved manure spreader 147 utilizes a gate 41' and a discharge opening 35' in the back wall 13'. The discharge opening 35' has a pair of concave semi-circular surfaces 37'. A duct 53' surrounds the discharge opening 35'. The lowermost line of the envelope created by the rotating expellers 149 and 151 is approximately in horizontal alignment with the lowermost portion of the concave semi-circular surfaces 37' of the discharge opening 35'. A shelf 153 is welded to and extends rearwardly from the box back wall 13' under the expellers 149 and 151. The gear box mounting plate 155, shaft bearing plate 157, and gear box 81' are arranged to suit the horizontal attitude of the expellers 149 and 151.

Figure 11:
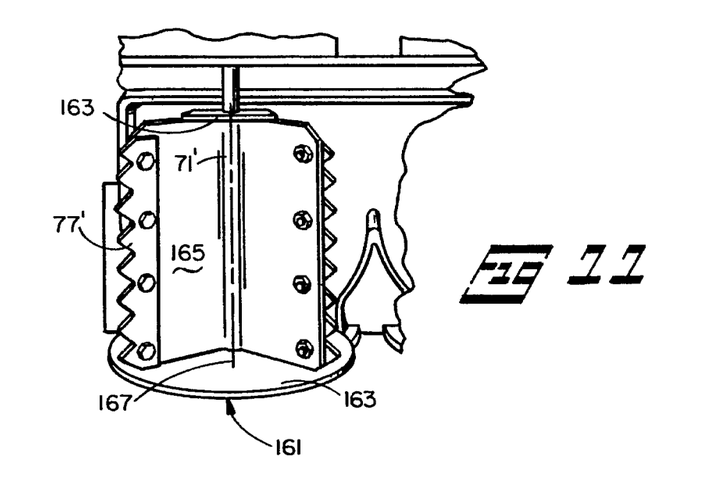
FIG. 11 is a perspective view of an alternate construction of the expeller.

FIG. 11 shows a modified expeller 161 that has two end plates 163 and one section of blades 165. The blades 165 extend radially from a central core 71'. The blades 165 terminate in teeth 77'. When the expellers 161 are used in vertically oriented pairs, the blades 165 of the two expellers are angularly offset relative to each other about their respective axes of rotation 167 such that the blades of one expeller are not aligned with the blades of the other expeller as the two expellers rotate. Although shown as being of full length, the expeller 161 may be shorter as discussed previously.

Thus, it is apparent that there has been provided, in accordance with the invention, an improved manure spreader that fully satisfies the aims and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

We claim:

1. An improved manure spreader comprising:

a. a box having front and back ends with side walls, a back wall, and a floor, the back wall having a discharge opening with a predetermined height therethrough, the floor being formed with a pair of generally semicircular channels partially defined by a generally vertical central web;

b. frame means for supporting the box to be rolled along the ground;

c. a pair of auger means lying horizontally within the respective channels in the box floor and terminating adjacent the back wall discharge opening;

d. gate means for selectively opening and closing the discharge opening; and e. a pair of expeller means mounted to the box back wall for rotating entirely outside the box about respective vertical axes, said expeller means being located proximate and in general horizontal alignment with the back wall discharge opening and having respective axial lengths that are at least one-half of the height of the discharge opening, so that said auger means can propel materials stored in the box through the discharge opening to the expeller means and the expeller means can fling the material over the ground.

2. Apparatus for spreading selected material onto a field comprising:

a. a wheeled frame for being pulled over the field;

b. a box supported by the frame for storing the material therein, the box having front and back walls, opposed side walls, and a floor, the box back wall having inside and outside surfaces and a discharge opening of a predetermined height therethrough;

c. gate means for selectively opening and closing the discharge opening in the box back wall;

d. expeller means mounted to the outside of the box back wall adjacent the discharge opening therein for rotating about vertical axes entirely outside of the box; and e. auger means located on the box floor for propelling materials stored in the box through the back wall discharge opening to the expeller means to be spread thereby onto the field, wherein the expeller means comprises a pair of expellers having respective vertical axes and located adjacent and in generally horizontal alignment with the discharge opening in the box back wall to receive material propelled by the auger means through the box back wall discharge opening and to fling the material onto the field, each expeller having an axial length that is at least one-half of the height of the discharge opening.

3. Apparatus for spreading selected material onto a field comprising:

a. a wheeled frame for being pulled over the field;

b. a box supported by the frame for storing the material therein, the box having front and back walls, opposed side walls, and a floor, the box back wall having inside and outside surfaces and a discharge opening of a predetermined height therethrough;

c. gate means for selectively opening and closing the discharge opening in the box back wall;

d. expeller means mounted to the outside of the box back wall adjacent the discharge opening therein for rotating about vertical axes entirely outside of the box; and e. auger means located on the box floor for propelling materials stored in the box through the back wall discharge opening to the expeller means to be spread thereby onto the field, wherein the expeller means comprises an expeller having a vertical axis and located adjacent and in general horizontal alignment with the discharge opening in the box back wall to receive material propelled by the auger means through the box back wall discharge opening and to fling the material onto the field, the expeller having an axial length that is at least one-half the height of the discharge opening.

* * * * *

(12) EX PARTE REEXAMINATION CERTIFICATE (8341st)
United States Patent
Meyer et al.

(10) Number: US 5,501,404 C1
(45) Certificate Issued: Jun. 28, 2011

(54) MANURE SPREADER WITH VERTICAL EXPELLERS

(75) Inventors: Donald A. Meyer, Dorchester, WI (US); Larry Meyer, Dorchester, WI (US)

(73) Assignee: Meyer Manufacturing Corp., Dorchester, WI (US)

Reexamination Request:
No. 90/010,007, Aug. 7, 2007

Reexamination Certificate for:
Patent No.: 5,501,404
Issued: Mar. 26, 1996
Appl. No.: 08/272,051
Filed: Jul. 8, 1994

Related U.S. Application Data

(63) Continuation-in-part of application No. 07/888,191, filed on May 26, 1992, now Pat. No. 5,368,236.

(51) Int. Cl.
*A01C 23/00* (2006.01)

(52) U.S. Cl. .................. 239/676; 239/679; 239/682; 111/11; D15/13

(58) Field of Classification Search .................. None
See application file for complete search history.

(56) References Cited

U.S. PATENT DOCUMENTS

| | | | |
|---|---|---|---|
| 4,350,303 A | * 9/1982 | van der Lely | 239/673 |
| 4,801,085 A | * 1/1989 | Fischer | 239/1 |
| 5,275,335 A | 1/1994 | Knight et al. | |
| 5,435,494 A | 7/1995 | Knight et al. | |

* cited by examiner

*Primary Examiner* — Joseph A. Kaufman (57) ABSTRACT

An improved manure spreader has two augers that lie in respective channels in the floor of the manure spreader box. The augers are journaled only at the front end of the box. Center and side holddowns overlie portions of the auger peripheries to restrain the augers from rising out of the channels. The augers propel material to a discharge opening in the box back wall. One or two rapidly rotating expellers on the outside of the box discharge opening receive the material and fling it onto the ground. The expellers may rotate about vertical or horizontal axes. A gate is slidable within the box back wall to selectively open and close the discharge opening. A breakup bar is pivotally connected between the gate and a cross brace in the box. Raising and lowering the gate simultaneously opens and closes the discharge opening and pivots the breakup bar. The breakup bar penetrates material in the box to thereby prevent bridging of the material over the augers. In a modified embodiment, a single auger is used, together with two side holddowns.

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-3 are cancelled.

\* \* \* \* \*